US012585746B2

(12) United States Patent
Shimizu

(10) Patent No.: US 12,585,746 B2
(45) Date of Patent: Mar. 24, 2026

(54) AUTHENTICATION SYSTEM, USER DEVICE, AND KEY INFORMATION TRANSMISSION METHOD

(71) Applicant: NEC Corporation, Tokyo (JP)

(72) Inventor: Yuta Shimizu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 65 days.

(21) Appl. No.: 18/694,041

(22) PCT Filed: Oct. 6, 2021

(86) PCT No.: PCT/JP2021/037057
§ 371 (c)(1),
(2) Date: Mar. 21, 2024

(87) PCT Pub. No.: WO2023/058176
PCT Pub. Date: Apr. 13, 2023

(65) Prior Publication Data
US 2024/0394353 A1 Nov. 28, 2024

(51) Int. Cl.
*G06F 21/32* (2013.01)
*G06V 40/16* (2022.01)

(52) U.S. Cl.
CPC ............. *G06F 21/32* (2013.01); *G06V 40/161* (2022.01)

(58) Field of Classification Search
None
See application file for complete search history.

(56) References Cited

U.S. PATENT DOCUMENTS

| | | | | |
|---|---|---|---|---|
| 2012/0095642 A1* | 4/2012 | Nishida | ................. | H04L 9/3234 |
| | | | | 701/1 |
| 2020/0223396 A1 | 7/2020 | Yi et al. | | |
| 2020/0307519 A1* | 10/2020 | Takada | .................. | B60R 25/252 |
| 2021/0124815 A1 | 4/2021 | Rindal | | |
| 2022/0097651 A1* | 3/2022 | Oishi | ...................... | G06F 21/32 |
| 2022/0408259 A1* | 12/2022 | Adel | ................. | H04W 12/0431 |

FOREIGN PATENT DOCUMENTS

| | | |
|---|---|---|
| JP | 2005-275869 A | 10/2005 |
| JP | 2008-174095 A | 7/2008 |
| JP | 2020-004044 A | 1/2020 |

OTHER PUBLICATIONS

International Search Report for PCT Application No. PCT/JP2021/037057, mailed on Dec. 14, 2021.

* cited by examiner

*Primary Examiner* — Christopher C Harris
(74) *Attorney, Agent, or Firm* — Sughrue Mion, PLLC

(57) ABSTRACT

The biological information acquisition means acquires biological information of the user. The determination means determines whether a predetermined condition is satisfied. In a case in which it is determined that the predetermined condition is satisfied, the key information transmission means transmits the key information to the mobile device. An authentication means authenticates the user by using the acquired biological information, encrypted biological information for collation, and the key information received by the key information reception means from the user device.

17 Claims, 8 Drawing Sheets

10

20

USER DEVICE

21
DETERMINATION MEANS

22
KEY INFORMATION TRANSMISSION MEANS

30

MOBILE DEVICE

31
BIOLOGICAL INFORMATION ACQUISITION MEANS

32
KEY INFORMATION RECEPTION MEANS

33
AUTHENTICATION MEANS

AUTHENTICATION SYSTEM, USER DEVICE, AND KEY INFORMATION TRANSMISSION METHOD

This application is a National Stage Entry of PCT/JP2021/037057 filed on Oct. 6, 2021, the contents of all of which are incorporated herein by reference, in their entirety.

TECHNICAL FIELD

The present disclosure relates to an authentication system, a user device, a mobile device, a key information transmission method, an authentication method, and a computer-readable medium.

BACKGROUND ART

A technique for capable of using an automobile using biological information instead of a key in an automobile is known. As a related art, Patent Literature 1 discloses a start control device including a fingerprint sensor. The start control device described in Patent Literature 1 compares a fingerprint read by the fingerprint sensor with a registered fingerprint registered in advance in a vehicle when a power source such as an engine is started up. In a case in which the read fingerprint is identical to the registered fingerprint, the start control device authenticates that the user is a valid user and permits the start-up of the power source. In a case in which the authentication fails, the start-up of the power source is not permitted.

CITATION LIST

Patent Literature

Patent Literature 1: Japanese Unexamined Patent Application Publication No. 2008-174095

SUMMARY OF INVENTION

Technical Problem

In Patent Literature 1, fingerprint information for collation is registered in a vehicle. In this case, there is a risk that personal information (fingerprint information) is leaked when the vehicle is stolen or the like.

The present disclosure was made in light of the aforementioned circumstances, and it is an object of the present disclosure to provide an authentication system, a user device, a mobile device, a key information transmission method, an authentication method, and a computer-readable medium which are capable of improving user convenience while reducing the risk of personal information leakage.

Solution to Problem

In order to achieve the above object, the present disclosure provides, as a first aspect, an authentication system. The authentication system includes a user device and a mobile device. The user device includes: a determination means for determining whether a predetermined condition is satisfied and a key information transmission means for transmitting key information in a case in which it is determined that the predetermined condition is satisfied. The mobile device includes a biological information acquisition means for acquiring biological information of a user, a key information reception means for receiving the key information transmitted from the user device, and an authentication means for authenticating the user by using the acquired biological information, encrypted biological information for collation, and the key information.

The present disclosure provides, as a second aspect, a mobile device. The mobile device includes a biological information acquisition means for acquiring biological information of a user, a key information reception means for receiving key information transmitted from a user device in a case in which it is determined that a predetermined condition is satisfied in the user device of the user who uses a mobile object, and an authentication means for authenticating the user by using the acquired biological information, encrypted biological information for collation, and the key information.

The present disclosure provides, as a third aspect, a user device. The user device includes a determination means for determining whether a predetermined condition is satisfied, and a key information transmission means for transmitting key information to a mobile device configured to authenticate a user by using biological information of the user, encrypted biological information for collation, and the key information in a case in which it is determined that the predetermined condition is satisfied.

The present disclosure provides, as a fourth aspect, a user authentication method. The user authentication method includes acquiring biological information of a user, receiving key information transmitted from a user device in a case in which it is determined that a predetermined condition is satisfied in the user device of the user who uses a mobile object, and authenticating the user by using the acquired biological information, encrypted biological information for collation, and the key information.

The present disclosure provides, as a fifth aspect, a key information transmission method. The key information transmission method includes determining whether a predetermined condition is satisfied, and transmitting key information to a mobile device configured to authenticate a user by using biological information of the user, encrypted biological information for collation, and the key information in a case in which it is determined that the predetermined condition is satisfied.

The present disclosure provides, as a sixth aspect, a computer-readable medium. The computer-readable medium stores a program for causing a processor to execute a process of: acquiring biological information of a user; receiving key information transmitted from a user device in a case in which it is determined that a predetermined condition is satisfied in the user device of the user who uses a mobile object; and authenticating the user by using the acquired biological information, encrypted biological information for collation, and the key information.

The present disclosure provides, as a seventh aspect, a computer-readable medium. The computer-readable medium stores a program for causing a processor to execute a process of: determining whether a predetermined condition is satisfied; and transmitting key information to a mobile device configured to authenticate a user by using biological information of the user, encrypted biological information for collation, and the key information in a case in which it is determined that the predetermined condition is satisfied.

Advantageous Effects of Invention

The authentication system, the user device, the mobile device, the key information transmission method, the authentication method, and the computer-readable medium according to the present disclosure can improve user convenience while reducing the risk of personal information leakage.

EXAMPLE EMBODIMENT

Figure 1:
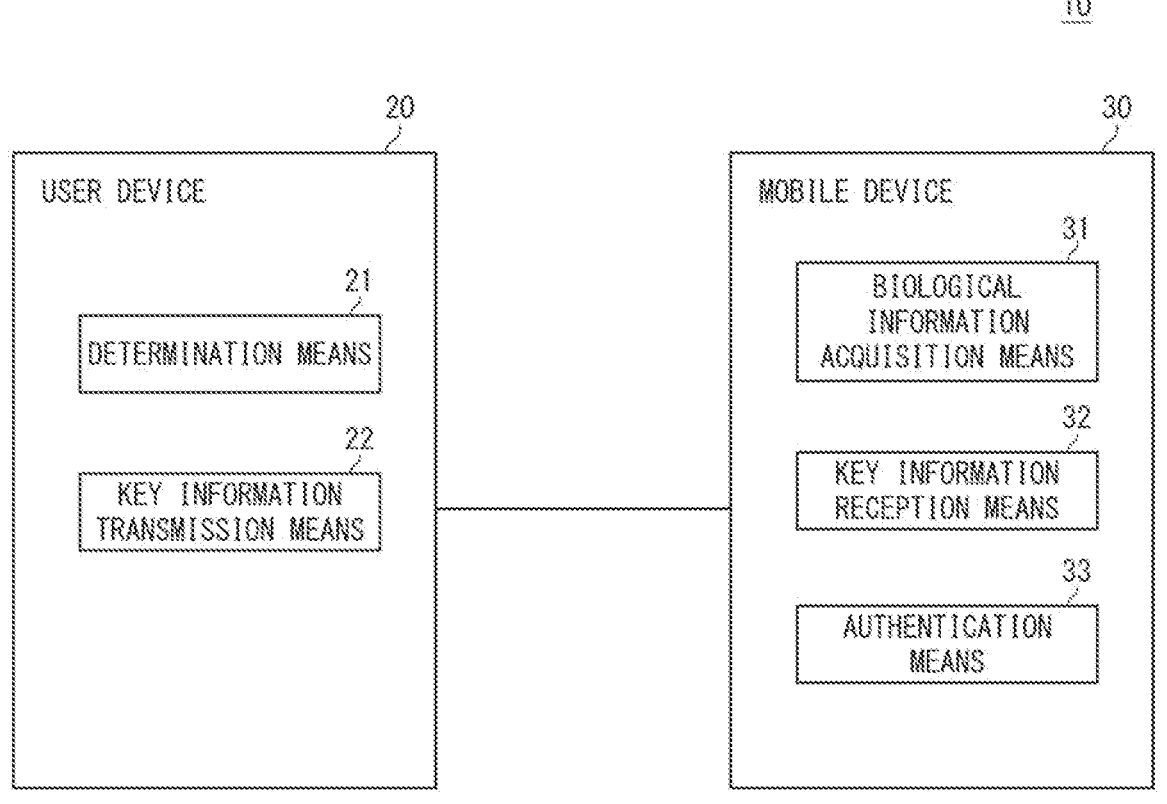
FIG. 1 is a block diagram illustrating a schematic configuration of an authentication system according to the present disclosure.

Prior to describing an example embodiment of the present disclosure, an overview of the present disclosure will be described. FIG. 1 illustrates a schematic configuration of an authentication system according to the present disclosure. The authentication system 10 includes a user device 20 and a mobile device 30. The mobile device 30 is configured as a device mounted on a vehicle such as an automobile, a bus, or a two-wheeled vehicle. The user device 20 is a device used by a user who uses a mobile object.

The user device 20 includes a determination means 21 and a key information transmission means 22. The determination means 21 determines whether a predetermined condition is satisfied. In a case in which the determination means 21 determines that the predetermined condition is satisfied, the key information transmission means 22 transmits key information to the mobile device 30.

The mobile device 30 includes a biological information acquisition means 31, a key information reception means 32, and an authentication means 33. The biological information acquisition means 31 acquires biological information of the user. The key information reception means 32 receives the key information transmitted from the user device 20. The authentication means 33 performs user authentication by using the biological information acquired by the biological information acquisition means 31, encrypted biological information for collation, and the key information received from the user device 20.

In the present disclosure, in the user device 20, the determination means 21 determines whether a predetermined condition is satisfied. In a case in which it is determined that the predetermined condition is satisfied, the key information transmission means 22 transmits the key information to the mobile device 30. In the mobile device 30, the authentication means 33 performs user authentication by using the key information transmitted from the user device 20. In the present disclosure, the key information transmitted from the user device 20 is necessary for the user authentication in the mobile device 30, and thus the risk of personal information leakage caused by vehicle theft or the like can be reduced.

In the present disclosure, the user device 20 does not transmit the key information to the mobile device 30 in a case in which the predetermined condition is not satisfied. In the present disclosure, the predetermined condition is set appropriately so that the key information can be transmitted from the user device 20 of the user who is going to use the mobile object serving an authentication target to the mobile device 30. Further, it is possible to suppress transmission of the key information from the user device 20 of the user who does not use the mobile object serving as the authentication target to the mobile device 30. In the present disclosure, since it is determined whether the key information is transmitted depending on to whether the predetermined condition is satisfied, the user need not to manually input whether the key information is transmitted. Therefore, the present disclosure can improve the user convenience.

Hereinafter, an example embodiment of the present disclosure will be described in detail with reference to the drawings. Note that, in the following description and drawings, omission and simplification are made as appropriate for clarity of description. Further, in each of the drawings, the same elements and similar elements are denoted by the same reference signs, and a duplicate description is omitted as necessary.

Figure 2:
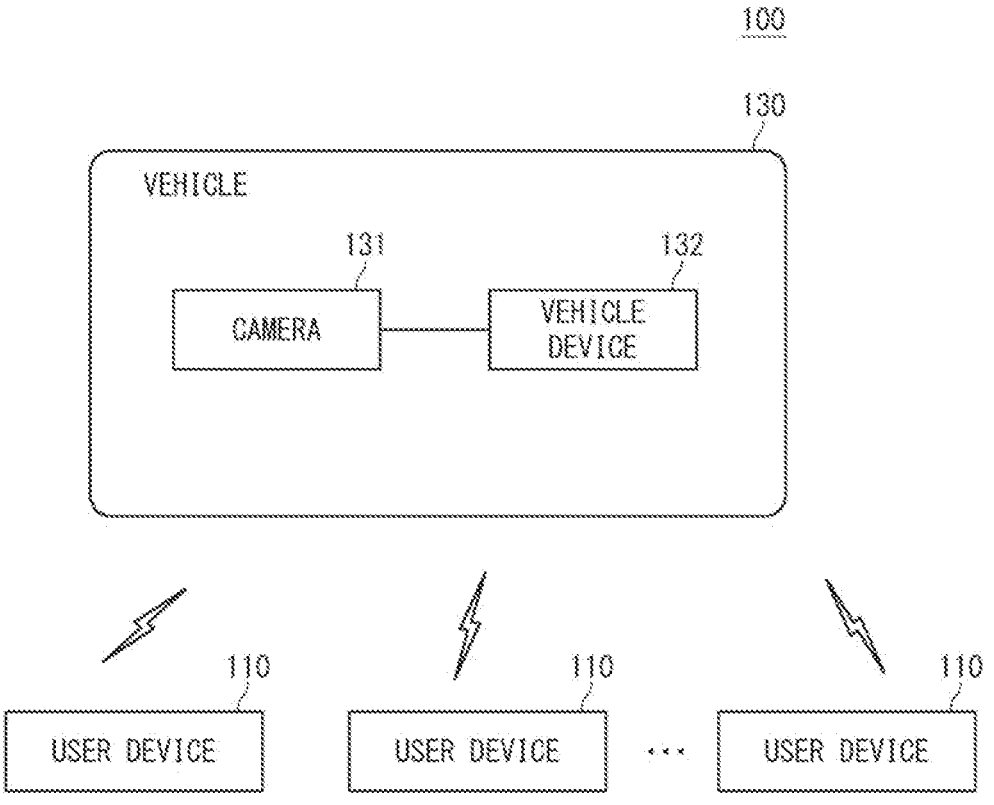
FIG. 2 is a block diagram illustrating an authentication system according to an example embodiment of the present disclosure.

FIG. 2 illustrates an authentication system according to an example embodiment of the present disclosure. The authentication system 100 includes a vehicle 130 and a user device 110. The present example embodiment is an example embodiment in which the authentication system 100 is applied to a keyless entry system of the vehicle 130. In the present example embodiment, the vehicle 130 is assumed to be used by a plurality of users. The authentication system 100 can have a plurality of user devices 110 per vehicle 130. Although FIG. 2 illustrates an example in which the authentication system 100 includes three user devices 110, the number of user devices 110 is not particularly limited. In the present example embodiment, it is assumed that face authentication is used as authentication using the biological information. The authentication system 100 is substantially equivalent to the authentication system 10 illustrated in FIG. 1.

The vehicle 130 includes a camera 131 and a vehicle device 132. The camera 131 is mounted on the vehicle 130 and photographs an area surrounding the vehicle 130. The vehicle device 132 acquires a captured video (image) from the camera 131. The vehicle device 132 may be disposed near a parking space of the vehicle 130 and acquire an image from the camera that photographs the vehicle 130 from the outside. The vehicle device 132 may acquire videos from a plurality of cameras 131. The vehicle device 132 has a wireless communication function and is configured to be able to communicate with the user device 110.

Each of the user devices 110 is configured as, for example, an information terminal device such as a smartphone, a mobile phone, or a tablet. Each of the user devices 110 is configured to be able to wirelessly communicate with the vehicle device 132. The user device 110 may be any device with a wireless communication function carried by the user. For example, near field communication such as Bluetooth (registered trademark) is used for wireless communication between each of the user devices 110 and the vehicle device 132. Each of the user devices 110 holds a secret key (key information) of each user.

Figure 3:
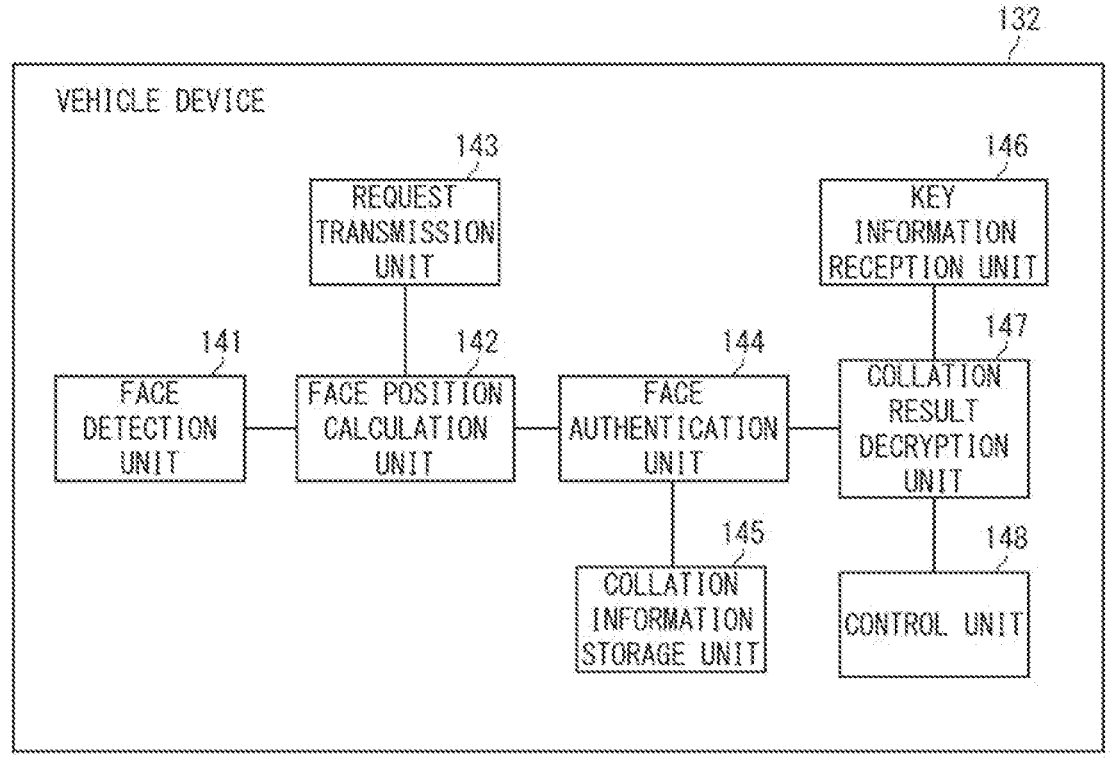
FIG. 3 is a block diagram illustrating a configuration example of a vehicle device.

FIG. 3 illustrates a configuration example of the vehicle device 132. The vehicle device 132 includes a face detection unit 141, a face position calculation unit 142, a request transmission unit 143, a face authentication unit 144, a collation information storage unit 145, a key information reception unit 146, and a collation result decryption unit 147. At least some of the functions of the respective units in the vehicle device 132 can be implemented by a processor executing a process in accordance with a program read from a memory. The vehicle device 132 is substantially equivalent to the mobile device 30 illustrated in FIG. 1.

The face detection unit 141 detects a face (face area) from the image acquired from the camera 131 (see FIG. 2). The face detection unit 141 detects, for example, a face area of a person (user) around the vehicle 130. The face detection unit 141 is substantially equivalent to the biological information acquisition means 31 illustrated in FIG. 1. The face position calculation unit (position acquisition means) 142 calculates a position of the user whose face has been detected. For example, the face position calculation unit 142 calculates a relative positional relationship between the vehicle 130 and the user.

In a case in which the user's face is detected, the request transmission unit (request transmission means) 143 transmits a secret key transmission request to the user device 110. For example, the request transmission unit 143 includes position information of the user calculated by the face position calculation unit 142 in the transmission request to be transmitted to the user device 110. Information (an address, a device name, and the like) of each of the user devices 110 of a plurality of users registered as the users of the vehicle 130 is registered in the vehicle device 132 in advance. For example, the request transmission unit 143 transmits the secret key transmission request to the user device 110 of the user registered in advance among the user devices capable of communicating with the vehicle device 132.

Figure 4:
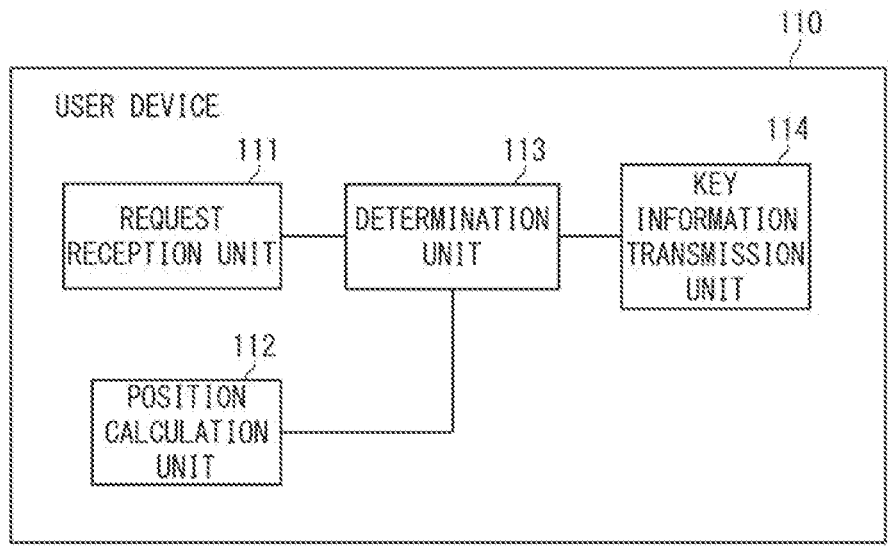
FIG. 4 is a block diagram illustrating a configuration example of a user device.

FIG. 4 illustrates a configuration example of the user device 110. The user device 110 includes a request reception unit 111, a position calculation unit 112, a determination unit 113, and a key information transmission unit 114. At least some of the functions of the respective units in the user device 110 can be implemented by a processor executing a process in accordance with a program read from a memory. The user device 110 is substantially equivalent to the user device 20 illustrated in FIG. 1.

The request reception unit (request reception means) 111 receives the secret key transmission request transmitted from the vehicle device 132 capable of performing communication. The request reception unit 111 receives, for example, the secret key transmission request including the position information of the user. The position information of the user included in the secret key transmission request indicates, for example, a relative position between the detected face (user) and the vehicle 130.

The position calculation unit (position calculation means) 112 calculates the position of the user device 110. The position calculation unit 112 calculates, for example, a relative positional relationship (relative position) between the user device 110 and the vehicle 130 as the position information of the user. The position calculation unit 112 sequentially calculates the position information of the user, and stores the calculated position information of the user in a memory (not illustrated) as time-series data.

For example, the user performs position calibration in the vehicle 130. The position calculation unit 112 determines the position of the user device 110 when the position calibration is performed as the position at which the relative position between the user device 110 and the vehicle 130 is 0. The position calculation unit 112 acquires sensor information from, for example, sensors such as an acceleration sensor and a gyro sensor (not illustrated) included in the user device 110. The position calculation unit 112 calculates a direction, a speed, or the like in which the user device 110 moves on the basis of the acquired sensor information, and sequentially calculates the relative position.

In a case in which the request reception unit 111 receives the secret key transmission request, the determination unit 113 determines whether a predetermined condition related to secret key transmission is satisfied. In the present example embodiment, the determination unit 113 determines whether the predetermined condition is satisfied on the basis of the position information of the user included in the secret key transmission request and the position information of the user calculated by the position calculation unit 112. For example, the determination unit 113 determines that the predetermined condition is satisfied when a difference between the position information of the user included in the secret key transmission request and the position information of the user calculated by the position calculation unit 112 is within a predetermined range. For example, the determination unit 113 determines that the predetermined condition is not satisfied when a difference between the position information of the user included in the secret key transmission request and the position information of the user calculated by the position calculation unit 112 exceeds a predetermined range. The determination unit 113 is substantially equivalent to the determination means 21 illustrated in FIG. 1.

In the user device 110, the request reception unit 111 may determine whether the user approaches or moves away from the vehicle 130 on the basis of the time-series data of the position information of the user calculated by the position calculation unit 112. In a case in which the user (user device 110) approaches the vehicle 130, it is considered that the user is likely to be going to get on the vehicle 130. On the other hand, in a case in which the user moves away from the vehicle 130, it is considered that the user is unlikely to get on the vehicle 130. In a case in which it is determined that the user approaches the vehicle 130, the request reception unit 111 may receive the secret key transmission request transmitted from the vehicle device 132. In a case in which it is determined that the user moves away from the vehicle 130, the request reception unit 111 may not receive the secret key transmission request from the vehicle device 132. In this case, the user device 110 can receive the secret key transmission request in a case in which the user is likely to get on the vehicle 130.

In a case in which the determination unit 113 determines that the predetermined condition is satisfied, the key information transmission unit 114 transmits the secret key held in the memory (not illustrated) to the vehicle device 132. For example, in a case in which the position information of the user included in the secret key transmission request is substantially identical to the position information of the user calculated by the position calculation unit 112, the key information transmission unit 114 transmits the secret key to the vehicle device 132. In a case in which the position information of the user included in the transmission request of the secret key is different from the position information of the user calculated by the position calculation unit 112, the user device 110 does not transmit the secret key even in a case in which the secret key transmission request is received.

The key information transmission unit 114 is substantially equivalent to the key information transmission means 22 illustrated in FIG. 1.

Returning to FIG. 3, after the request transmission unit 143 transmits the secret key transmission request to the user device 110, the key information reception unit 146 receives the secret key from the user device 110. The key information reception unit 146 is substantially equivalent to the key information reception means 32 illustrated in FIG. 1.

The collation information storage unit 145 stores information (collation information) for collation of each of a plurality of users registered as the users of the vehicle 130. The collation information storage unit 145 stores, for example, the collation information of each of a plurality of users in a non-volatile memory. The collation information may be a face image of the user or information indicating a feature extracted from the face image of the user. In the present example embodiment, the collation information storage unit 145 stores encrypted collation information. For example, the collation information stored in the collation information storage unit 145 is encrypted with a public key associated with a secret key held in the user device 110.

The face authentication unit 144 collates the user of the face detected by the face detection unit 141 with the user stored in the collation information storage unit 145 on the basis of the image of the face area detected by the face detection unit 141 and the collation information stored in the collation information storage unit 145. In the present example embodiment, the face authentication unit 144 performs the collation of the user in the encrypted state by using the encrypted collation information. For example, the face authentication unit 144 encrypts the face image detected by the face detection unit 141 or a feature quantity thereof with a public key associated with the secret key. The face authentication unit 144 collates the encrypted face image or the feature quantity thereof with the collation information stored in the collation information storage unit 145, and outputs an encrypted collation result.

The collation result decryption unit 147 acquires the secret key which is received from the user device 110 by the key information reception unit 146. The collation result decryption unit 147 decrypts the encrypted collation result output from the face authentication unit 144 by using the acquired secret key. The collation result decryption unit 147 outputs, for example, a collation score of each user as an authentication result. In the present example embodiment, the user authentication is not particularly limited to the face authentication described above. Other user authentication that uses encrypted information and is implemented by using the secret key obtained from the user device 110 may be used for the authentication of the user. The face authentication unit 144 and the collation result decryption unit 147 are substantially equivalent to the authentication means 33 illustrated in FIG. 1.

The control unit (control means) 148 acquires the authentication result from the collation result decryption unit 147, and controls locking of the doors of the vehicle 130 on the basis of the acquired authentication result. For example, in a case in which the authentication result indicates that the user of the face detected by the face detection unit 141 is identical to any of the users registered in advance, the control unit 148 unlocks the doors of the vehicle 130. In a case in which the authentication result indicates that the user of the face detected by the face detection unit 141 is not identical to any of the users registered in advance, the control unit 148 keeps the doors of the vehicle 130 locked.

Figure 5:
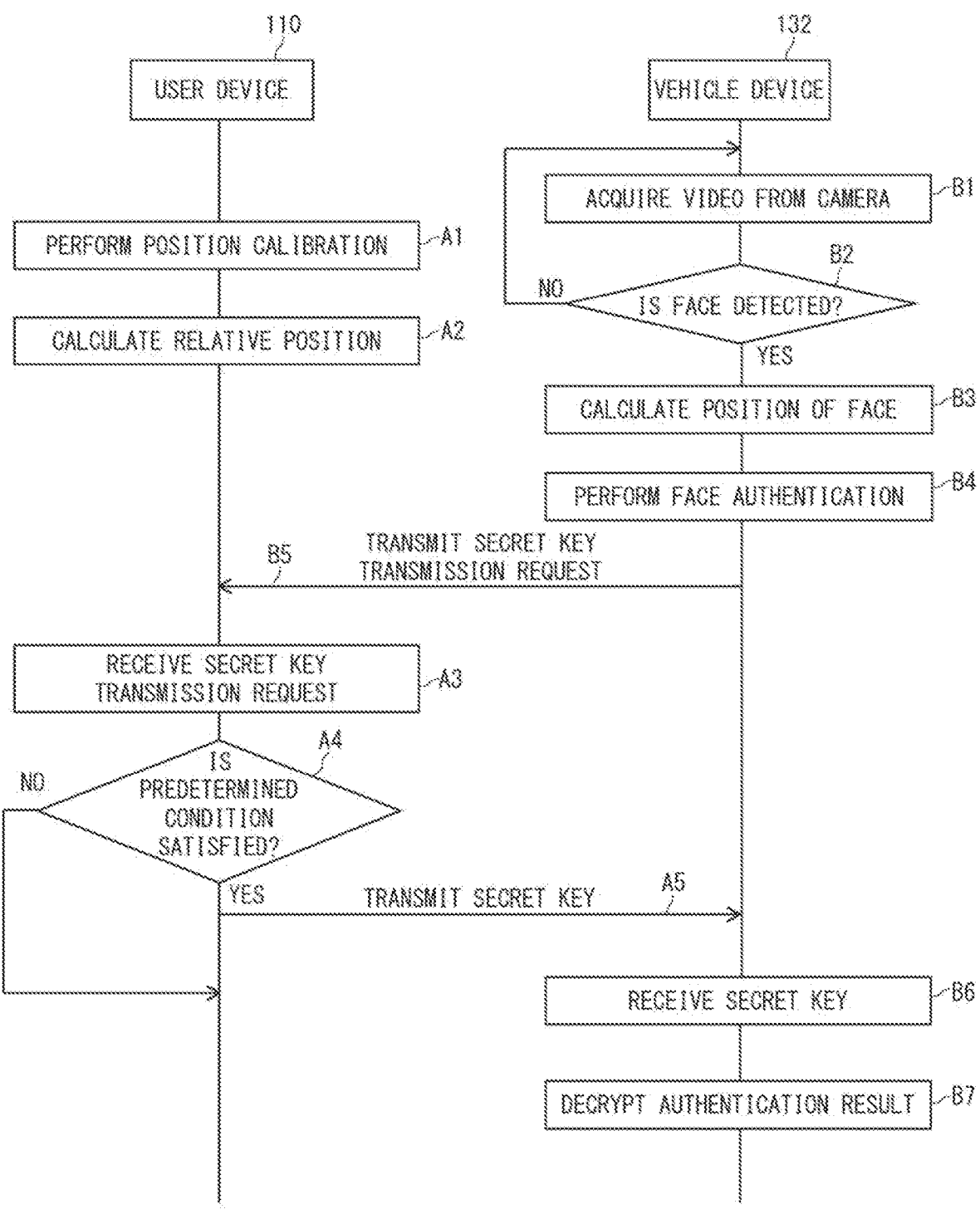
FIG. 5 is a sequence diagram illustrating an operation procedure in the authentication system.

Next, an operation procedure will be described. FIG. 5 illustrates an operation procedure in the authentication system 100. The operation procedure of the authentication system 100 includes an operation procedure (key information transmission method) in the user device 110 and an operation procedure (authentication method) in the vehicle device 132. In the user device 110, the position calculation unit 112 (see FIG. 4) performs the position calibration (step A1). As the position calibration is performed, a spot at which the relative position between the user device 110 and the vehicle 130 is 0 is set. After the position calibration, the position calculation unit 112 calculates the position information of the user, that is, the relative position between the user device 110 and the vehicle 130 (step A2). The position calculation unit 112 periodically performs the calculation of the relative position in step A2.

In the vehicle device 132, the face detection unit 141 (see FIG. 3) acquires a video from the camera 131 (see FIG. 2) (step B1). The face detection unit 141 determines whether a face has been detected around the vehicle 130 (step B2). Any algorithm can be used for face detection in the face detection unit 141. In a case in which it is determined in step B2 that a face has been detected, the face position calculation unit 142 calculates the position of the detected face (step B3). In step B3, the face position calculation unit 142 calculates the relative positional relationship between the detected face and the vehicle 130.

The face authentication unit 144 performs the face authentication on the face detected by the face detection unit 141 (step B4). The face authentication in step B4 is performed in an encrypted state. In other words, the result of the face authentication is encrypted. For example, in step B4, the face authentication unit 144 encrypts the face (face image) detected by the face detection unit 141 or the feature quantity thereof by using the public key associated with the secret key held in the user device 110. The face authentication unit 144 collates the encrypted face or the feature quantity thereof with the collation information stored in the collation information storage unit 145.

The request transmission unit 143 transmits the secret key transmission request to the user device 110 (step B5). The secret key transmission request includes the position of the face calculated in step B3. In step B5, the request transmission unit 143 transmits the secret key transmission request to the user device 110 of the user registered as the user in advance. Step B4 and step B5 may be performed at different timings or may be performed in parallel. The key information reception unit 146 is on standby until the secret key is transmitted from the vehicle device 132 after the secret key transmission request is transmitted.

In the user device 110, the request reception unit 111 receives the secret key transmission request from the vehicle device 132 located in a range in which communication with the user device 110 can be performed (step A3). In a case in which the user device 110 approaches the vehicle 130, the request reception unit 111 may transition to a state capable of receiving the secret key transmission request and then receive the secret key transmission request. The determination unit 113 determines whether a predetermined condition related to transmission of the secret key is satisfied (step A4). In step A4, for example, the determination unit 113 determines that the predetermined condition is satisfied when the position information of the user included in the secret key transmission request is substantially identical to the position information of the user calculated by the position calculation unit 112.

In a case in which it is determined in step A4 that the predetermined condition is satisfied, the key information transmission unit 114 transmits the secret key to the vehicle device 132 (step A5). In step A5, the key information transmission unit 114 transmits the secret key to the vehicle device 132 that has transmitted the secret key transmission request received in step A3. In a case in which the predetermined condition is not satisfied, the secret key transmission request is declined, and the secret key is not transmitted from the user device 110 to the vehicle device 132.

In a case in which there is a user device 110 that transmits the secret key, the key information reception unit 146 receives the secret key from the user device 110 (step B6). In a case in which the secret key is received, the collation result decryption unit 147 decrypts the authentication result of the face authentication unit 144 (step B7).

In a case in which the user authentication is successful, the control unit 148 unlocks the doors of the vehicle 130. In a case in which the user authentication fails, the control unit 148 keeps the doors of the vehicle 130 locked. In a case in which the secret key is not received and thus it cannot decrypt the authentication result, the control unit 148 keeps the doors of vehicle 130 locked.

Figure 6:
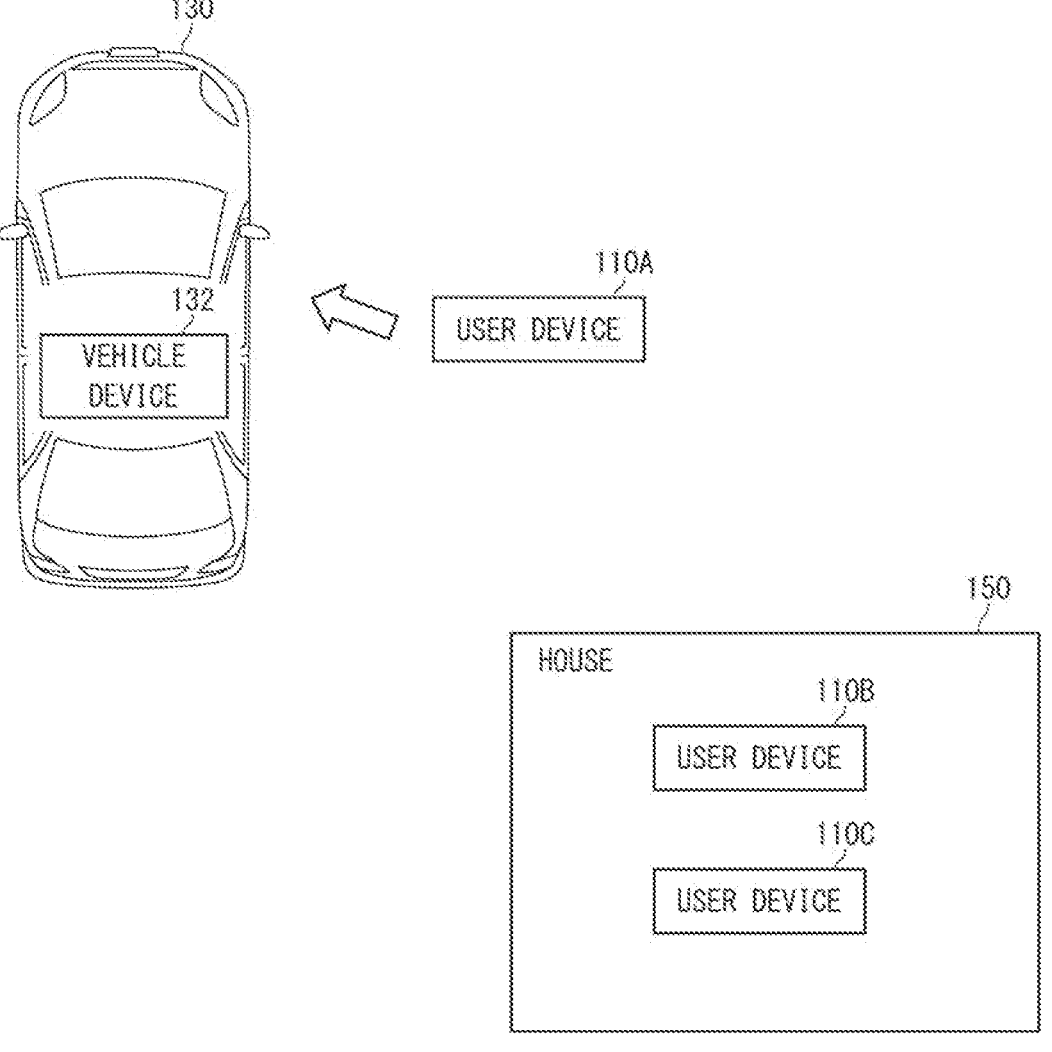
FIG. 6 is a diagram illustrating an example of a positional relationship between a vehicle and a plurality of user devices.

FIG. 6 illustrates an example of the positional relationship between the vehicle 130 and a plurality of user devices 110. In the following description, an example in which a user A, a user B, and a user C are registered as the users of the vehicle 130 is considered. Information of each of a user device 110A used by the user A, a user device 110B used by the user B, and a user device 110C used by the user C is registered in the vehicle device 132. In the example of FIG. 6, the user A is assumed to approach the vehicle 130 in order to get on the vehicle 130. The user B and the user C are assumed to be in the house 150.

The vehicle device 132 detects the face of the user A and transmits the secret key transmission request to the user devices 110A to 110C. The secret key transmission request transmitted by the vehicle device 132 includes the detected position information of the user A. The user device 110A of the user A receives the secret key transmission request transmitted from the vehicle device 132. In a case in which the user B and the user C are in the house 150, but the user device 110B and the user device 110C are located in the communicable range of the vehicle device 132, the user device 110B and the user device 110C receive the secret key transmission request.

The user device 110A compares the position information calculated in the user device 110A with the position information of the user included in the secret key transmission request. In a case in which the position information calculated in the device is substantially identical to the position information of the user included in the secret key transmission request, the user device 110A transmits the secret key to the vehicle device 132 in response to the secret key transmission request. On the other hand, even in a case in which the secret key transmission request is received, the user device 110B and the user device 110C do not transmit the secret key because the position information calculated in each user device is different from the position information of the user included in the secret key transmission request.

In the present example embodiment, the face authentication unit 144 conceals the face image or the feature quantity extracted from the face image, and performs the face authentication by using the concealed information. In a case in which the feature quantity (biological information) of the user is held in the vehicle 130, when the vehicle 130 is stolen together with the vehicle device 132 due to vehicle theft or the like, the feature quantity of the user may be leaked. In the present example embodiment, the authentication result of the face authentication unit 144 cannot be decrypted without the secret key held by the user (the user device 110). Therefore, even though the feature quantity of the user is leaked, a malicious third party cannot perform the face authentication unless the secret key is leaked. In addition, in the present example embodiment, since the feature quantity cannot be used for authentication by the user invalidating the secret key, it is possible to reduce the risk in a case in which the personal information is leaked and improve the security.

Here, in order to ensure the security, it is necessary to store the secret key in a place different from the vehicle. In the present example embodiment, the secret key is held in the user device 110 such as a smartphone of the user registered in the vehicle. In this case, it is desirable to avoid always transmitting certain information such as the smart key from the user device 110 in terms of security. In the present example embodiment, the secret key transmission request is transmitted from the vehicle device 132 to the user device 110, and the secret key is transmitted from the user device 110 that has received the transmission request to the vehicle device 132.

In the above case, in a case in which there are a plurality of users for one vehicle 130, the vehicle device 132 does not know the user device 110 to which the secret key transmission request should be transmitted. For example, it is assumed that, in a case in which one vehicle 130 is shared by a family, all the user devices 110 of the family are located in the radio wave coverage of the vehicle device 132. In this case, the secret key transmission request is received not only by the user device 110 of the user who gets on the vehicle 130 but also by the user device 110 of the user who does not intend to get on the vehicle 130.

In the present example embodiment, it is determined in each of the user devices 110 whether the secret key is transmitted in response to the secret key transmission request. Therefore, the secret key transmission request becomes invisible to the user who does not intend to get on the vehicle 130. As a result, the user who does not intend to get on the vehicle 130 need not to manually decline the secret key transmission request, and the convenience of the user can be improved. In the present example embodiment, since the secret key is transmitted only from the user device 110 satisfying the predetermined condition, even though the radio wave is relayed by relay attack, the secret key is not transmitted unless the relative position changes, and thus the security is maintained. As described above, in the present example embodiment, in the entry system of the vehicle using the face authentication, it is possible to improve convenience while reducing the risk of leakage of personal information caused by the vehicle theft.

Further, in the above example embodiment, the example in which the secret key is transmitted to the vehicle device 132 after the secret key transmission request is received from the user device 110 has been described. However, the above example embodiment is not limited thereto. For example, when approaching the vehicle, the user device 110 may determine that the predetermined condition is satisfied and then transmit the secret key to the vehicle device 132. In this case, the request transmission unit 143 (see FIG. 3) of the vehicle device 132 and the request reception unit 111 (see FIG. 4) of the user device 110 can be omitted.

Figure 7:
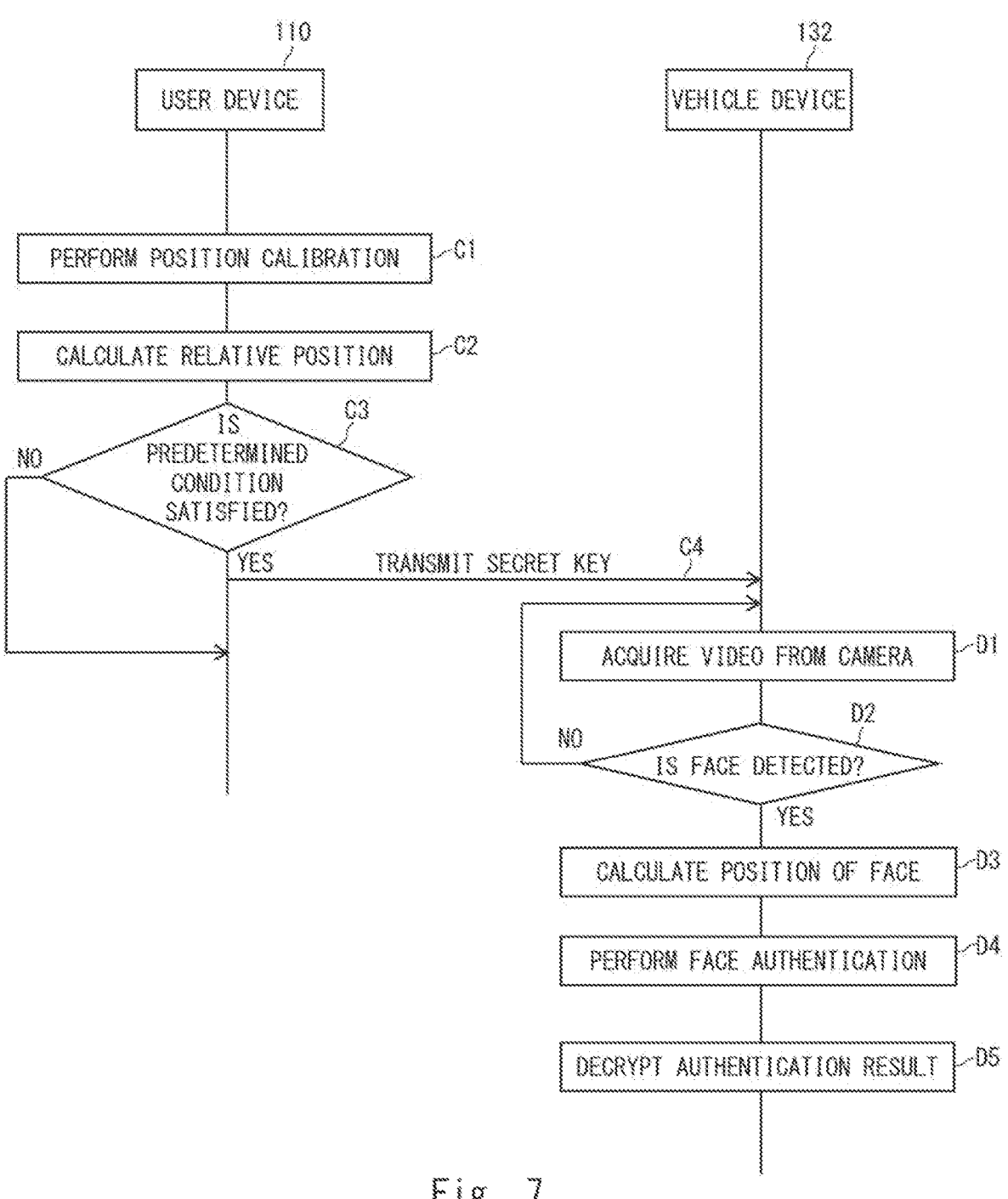
FIG. 7 is a sequence diagram illustrating another operation process in an authentication system.

FIG. 7 illustrates an operation procedure of the authentication system 100 in a case in which transmission and reception of the secret key transmission request are omitted. In the user device 110, the position calculation unit 112 performs the position calibration (step C1). After the position calibration, the position calculation unit 112 calculates the position information of the user, that is, the relative position between the user device 110 and the vehicle 130 (step C2). Steps C1 and C2 may be similar to steps A1 and A2 illustrated in FIG. 5.

The determination unit 113 determines whether a predetermined condition related to transmission of the secret key is satisfied (step C3). In step C3, the determination unit 113 determines whether the predetermined condition is satisfied on the basis of the relative position calculated in step C2, for example. For example, the determination unit 113 determines whether the user approaches the vehicle 130 on the basis of the relative position calculated in step C2. In a case in which the user is detected to approach the vehicle 130, the determination unit 113 determines that the predetermined condition is satisfied.

In a case in which it is determined in step C3 that the predetermined condition is satisfied, the key information transmission unit 114 transmits the secret key to the vehicle device 132 (step C4). In the vehicle device 132, the key information reception unit 146 (see FIG. 3) receives the secret key from the user device 110. In a case in which the predetermined condition is not satisfied, the secret key is not transmitted from the user device 110 to the vehicle device 132.

In the vehicle device 132, the face detection unit 141 acquires a video from the camera 131 (see FIG. 2) (step D1). The face detection unit 141 determines whether a face has been detected around the vehicle 130 (step D2). In a case in which it is determined in step D2 that a face has been detected, the face position calculation unit 142 calculates the position of the detected face (step D3). The face authentication unit 144 performs the face authentication on the face detected by the face detection unit 141 (step D4). Steps D1 to D4 may be similar to steps B1 to B4 illustrated in FIG. 5.

As described above, the face authentication in step D4 is performed in an encrypted state. The collation result decryption unit 147 decrypts the authentication result of the face authentication unit 144 by using the secret key received by the key information reception unit 146 from the user device 110 (step D5). Note that the timing at which the key information reception unit 146 receives the secret key from the user device 110 is not particularly limited to a specific timing. The key information reception unit 146 may receive the secret key from the user device 110 while steps D1 to D4 are being performed. Alternatively, the key information reception unit 146 may receive the secret key from the user device 110 after step D4 is performed.

Figure 8:
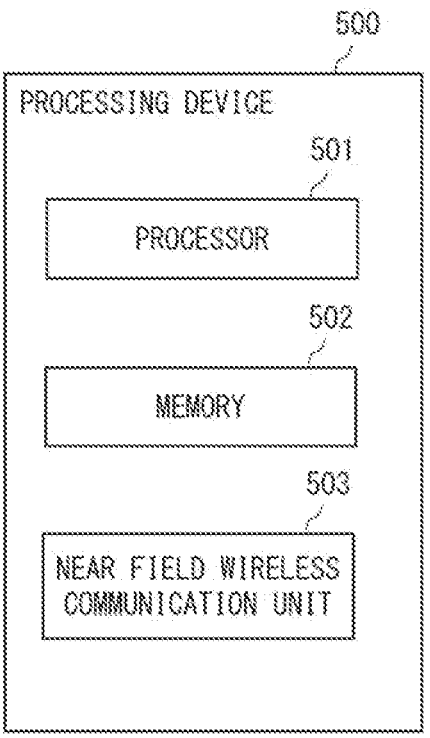
FIG. 8 is a block diagram illustrating an example of a physical configuration of a processing device.

In the above example embodiment, at least one of the user device 110 and the vehicle device 132 may be configured as a processing device having a communication function. FIG. 8 illustrates an example of a physical configuration of a processing device that can be used as the user device 110 and the vehicle device 132. The processing device 500 includes one or more processors 501, one or more memories 502, and a near field wireless communication unit 503. The memory 502 includes a non-volatile storage device such as a read only memory (ROM), a volatile storage device such as a random access memory (RAM), or a combination thereof. The memory 502 stores a program executed by the processor 501. The processor 501 reads the program from the memory 502 and executes the program. As the processor 501 executes various processes in accordance with the program, at least some of the functions of the units illustrated in FIGS. 3 and 4 can be implemented.

The program described above includes a group of commands (or software codes) for causing a computer to perform one or more functions described in the example embodiments when read into the processor (computer). The program may be stored in a non-transitory computer-readable medium or a tangible storage medium. As an example and not by way of limitation, a computer-readable medium or tangible storage medium includes a RAM, a ROM, a flash memory, a solid-state drive (SSD) or other memory technologies, a compact disc (CD)-ROM, a digital versatile disc (DVD), a Blu-ray (registered trademark) disk or other optical disk storages, a magnetic cassette, a magnetic tape, a magnetic disk storage, or other magnetic storage devices. The program may be transmitted on a transitory computer-readable medium or a communication medium. As an example and not by way of limitation, the transitory computer-readable medium or the communication medium includes propagated signals in electrical, optical, acoustic, or any other form.

The near field wireless communication unit 503 performs wireless communication with near field wireless communication units of other processing devices. The near field wireless communication unit 503 is configured as a wireless communication unit compatible with a communication scheme such as Bluetooth or near field communication (NFC). In the user device 110, the request reception unit 111 and the key information transmission unit 114 perform communication with the vehicle device 132 by using the near field wireless communication unit 503. Furthermore, in the vehicle device 132, the request transmission unit 143 and the key information reception unit 146 perform communication with the user device 110 by using the near field wireless communication unit 503.

In the above example embodiment, the example in which the vehicle device 132 performs all of the face detection, the encrypted face authentication, and the decryption of the authentication result has been described, but the present disclosure is not limited thereto. Some of the functions of the vehicle device 132 may be implemented by other devices such as a cloud server. For example, the functions of the face authentication unit 144 may be transferred to a cloud server, and the collation result decryption unit 147 may acquire an encrypted face authentication result from the cloud server.

In the above example embodiment, the example in which the control unit 148 controls the locking of the doors has been described, but the present disclosure is not limited thereto. For example, the control unit 148 may not only unlock the doors but also turn on the drive source such as the engine so as to cause the vehicle 130 to enter a state ready for driving.

In the above example embodiment, the example using the face authentication has been described as an example of the authentication using the biological information, but the present disclosure is not limited thereto. For example, a controlled device such as the vehicle 130 may be provided with a fingerprint sensor, and user authentication may be performed using fingerprint information. In a case in which a contact-type sensor such as a fingerprint reader is used for authentication using biological information, the secret key transmission request may include the position of the fingerprint reader as the position information of the user.

In the above example embodiment, the example in which the position calculation unit 112 calculates the relative position between the vehicle 130 and the user by using sensor information in the user device 110 has been described, but the present disclosure is not limited thereto. The position calculation unit 112 may generate the position information of the user by using the position information of the user device 110 measured by using, for example, a global navigation satellite system (GNSS). For example, in a case in which the user is away from the vehicle 130 by a predetermined distance or more, the position calculation unit 112 stores position information of a spot measured by using the GNSS as a position at which the user is away from the vehicle 130. In a case in which the user approaches the vehicle 130 again, the position calculation unit 112 may restart the position calculation using sensor information such as a gyro sensor on the basis of the position at which the user is away from the vehicle 130, and generate the position information of the user.

In the above example embodiment, the example in which the public key encryption scheme is used as the encryption scheme has been described. However, the present disclosure is not limited thereto. In the above example embodiment, the collation result decryption unit 147 (see FIG. 3) of the vehicle device 132 only needs to decrypt the encrypted collation result by using the key information received from the user device 110, and the key information transmitted from the user device is not limited to the secret key. For example, a common key encryption scheme may be used as the encryption scheme. In this case, the key information transmission unit 114 (see FIG. 4) of the user device 110 may transmit a common key used for encryption and decryption to the vehicle device 132. In the vehicle device 132, the face authentication unit 144 encrypts the detected face image or the feature quantity thereof by using the common key received from the user device 110. Further, the collation result decryption unit 147 decrypts the encrypted collation result by using the common key.

In the above example embodiment, the example in which the secret key transmission request is transmitted to the user device 110 after the face used for the face authentication is detected in the vehicle device 132 has been described with reference to FIG. 5. However, the present disclosure is not limited thereto. The request transmission unit 143 of the vehicle device 132 may detect the user approaching the vehicle 130, and transmit the secret key transmission request to the user device 110 when it is detected that the user approaches the vehicle 130. It is possible to detect whether the user approaches the vehicle 130 in accordance with, for example, strength of a radio signal output from the user device 110.

Although the example embodiment according to the present disclosure has been described above in detail, the present disclosure is not limited to the above-described example embodiment, and the present disclosure also includes those that are obtained by making changes or modifications to the above-described example embodiments without departing from the scope and spirit of the present disclosure.

For example, the whole or part of the example embodiment disclosed above can be described as, but not limited to, the following supplementary notes.

Supplementary Note 1

An authentication system including:
a user device; and a mobile device, wherein
the user device includes
a determination means for determining whether a predetermined condition is satisfied, and
a key information transmission means for transmitting key information in a case in which it is determined that the predetermined condition is satisfied, and
the mobile device includes a biological information acquisition means for acquiring biological information of a user,
a key information reception means for receiving the key information transmitted from the user device, and
an authentication means for authenticating the user by using the acquired biological information, encrypted biological information for collation, and the key information.

Supplementary Note 2

The authentication system according to supplementary note 1, wherein
the user device further includes a request reception means for receiving a key information transmission request,
the mobile device further includes a request transmission means for transmitting the key information transmission request to the user device, and
the determination means determines whether the predetermined condition is satisfied when the transmission request is received.

Supplementary Note 3

The authentication system according to supplementary note 2, wherein
the request transmission means transmits position information of the user whose biological information is acquired to the user device, and
the determination means determines whether the predetermined condition is satisfied by using the position information of the user transmitted from the request transmission means.

Supplementary Note 4

The authentication system according to supplementary note 3, wherein
the user device further includes a position calculation means for calculating position information of the user device, and
the determination means compares the position information calculated by the position calculation means with the position information of the user transmitted from the request transmission means, and determines whether the predetermined condition is satisfied on the basis of a result of the comparison.

Supplementary Note 5

The authentication system according to supplementary note 4, wherein
the request transmission means transmits a relative position between the user whose biological information is acquired and a mobile object to the user device as the position information of the user, and
the position calculation means calculates the relative position between the user device and the mobile object as the position information of the user device.

Supplementary Note 6

The authentication system according to supplementary note 4 or 5, wherein the determination means determines that the predetermined condition is satisfied in a case in which a difference between the position information calculated by the position calculation means and the position information of the user transmitted from the request transmission means is within a predetermined range.

Supplementary Note 7

The authentication system according to any one of supplementary notes 4 to 6, wherein the request reception means determines whether the user approaches a mobile object on the basis of a change in the position information calculated by the position calculation means, and receives the key information transmission request in a case in which it is determined that the user approaches the mobile object.

Supplementary Note 8

The authentication system according to any one of supplementary notes 3 to 7, wherein the mobile device further includes a position acquisition means for acquiring the position information of the user whose biological information is acquired.

Supplementary Note 9

The authentication system according to supplementary note 8, wherein
the biological information acquisition means includes a face detection means for detecting a face of the user photographed by using a camera, and
the position acquisition means acquires a position of the face detected by the face detection means as the position information of the user whose biological information is acquired.

Supplementary Note 10

The authentication system according to any one of supplementary notes 1 to 9, wherein the authentication means encrypts the acquired biological information, collates the encrypted biological information with the biological information for collation, generates an encrypted collation result, and decrypts the encrypted collation result by using the key information.

Supplementary Note 11

The authentication system according to supplementary note 10, wherein the authentication means is on standby until the key information is received after the encrypted collation result is generated, and decrypts the encrypted collation result after the key information is received.

Supplementary Note 12

The authentication system according to any one of supplementary notes 1 to 11, further including a control means for controlling a mobile object on the basis of an authentication result of the authentication means.

Supplementary Note 13

A mobile device including:
a biological information acquisition means for acquiring biological information of a user;
a key information reception means for receiving key information transmitted from a user device in a case in which it is determined that a predetermined condition is satisfied in the user device of the user who uses a mobile object; and
an authentication means for authenticating the user by using the acquired biological information, encrypted biological information for collation, and the key information.

Supplementary Note 14

The mobile device according to supplementary note 13, further including a request transmission means for transmitting a key information transmission request to the user device.

Supplementary Note 15

The mobile device according to supplementary note 14, wherein the request transmission means transmits, to the user device, position information of the user whose biological information is acquired.

Supplementary Note 16

The mobile device according to supplementary note 15, wherein the request transmission means transmits a relative position between the user whose biological information is acquired and the mobile object to the user device as the position information of the user.

Supplementary Note 17

The mobile device according to any one of supplementary notes 13 to 16, wherein the authentication means encrypts the acquired biological information, collates the encrypted biological information with the biological information for collation, generates an encrypted collation result, and decrypts the encrypted collation result by using the key information.

Supplementary Note 18

A user device including:
a determination means for determining whether a predetermined condition is satisfied; and
a key information transmission means for transmitting key information to a mobile device configured to authenticate a user by using biological information of the user, encrypted biological information for collation, and the key information in a case in which it is determined that the predetermined condition is satisfied.

Supplementary Note 19

The user device according to supplementary note 18, further including a request reception means for receiving a key information transmission request from the mobile device.

Supplementary Note 20

The user device according to supplementary note 19, wherein
the request reception means receives position information of the user whose biological information is acquired from the mobile device, and the determination means determines whether the predetermined condition is satisfied by using the position information of the user received by the request reception means.

Supplementary Note 21

The user device according to supplementary note 20, further including, a position calculation means for calculating position information of the user device, wherein the determination means compares the position information calculated by the position calculation means with the position information of the user received by the request reception means, and determines whether the predetermined condition is satisfied on the basis of a result of the comparison.

Supplementary Note 22

The user device according to supplementary note 21, wherein the determination means determines that the predetermined condition is satisfied in a case in which a difference between the position information calculated by the position calculation means and the position information of the user received by the request reception means is within a predetermined range.

Supplementary Note 23

The user device according to supplementary note 21 or 22, wherein the request reception means determines whether the user approaches a mobile object on the basis of a change in the position information calculated by the position calculation means, and receives the key information transmission request in a case in which it is determined that the user approaches the mobile object.

Supplementary Note 24

A user authentication method including:
acquiring biological information of a user;
receiving key information transmitted from a user device in a case in which it is determined that a predetermined condition is satisfied in the user device of the user who uses a mobile object; and
authenticating the user by using the acquired biological information, encrypted biological information for collation, and the key information.

Supplementary Note 25

A key information transmission method including:
determining whether a predetermined condition is satisfied; and
transmitting key information to a mobile device configured to authenticate a user by using biological information of the user, encrypted biological information for collation, and the key information in a case in which it is determined that the predetermined condition is satisfied.

Supplementary Note 26

A non-transitory computer-readable medium having a program stored therein, the program causing a processor to execute a process of:
acquiring biological information of a user;

receiving key information transmitted from a user device in a case in which it is determined that a predetermined condition is satisfied in the user device of the user who uses a mobile object; and
authenticating the user by using the acquired biological information, encrypted biological information for collation, and the key information.

Supplementary Note 27

A non-transitory computer-readable medium having a program stored therein, the program causing a processor to execute a process of:
determining whether a predetermined condition is satisfied; and
transmitting key information to a mobile device configured to authenticate a user by using biological information of the user, encrypted biological information for collation, and the key information in a case in which it is determined that the predetermined condition is satisfied.

REFERENCE SIGNS LIST

10 AUTHENTICATION SYSTEM
20 USER DEVICE
21 DETERMINATION MEANS
22 KEY INFORMATION TRANSMISSION MEANS
30 MOBILE DEVICE
31 BIOLOGICAL INFORMATION ACQUISITION MEANS
32 KEY INFORMATION RECEPTION MEANS
33 AUTHENTICATION MEANS
100 AUTHENTICATION SYSTEM
110 USER DEVICE
111 REQUEST RECEPTION UNIT
112 POSITION CALCULATION UNIT
113 DETERMINATION UNIT
114 KEY INFORMATION TRANSMISSION UNIT
130 VEHICLE
131 CAMERA
132 VEHICLE DEVICE
141 FACE DETECTION UNIT
142 FACE POSITION CALCULATION UNIT
143 REQUEST TRANSMISSION UNIT
144 FACE AUTHENTICATION UNIT
145 COLLATION INFORMATION STORAGE UNIT
146 KEY INFORMATION RECEPTION UNIT
147 COLLATION RESULT DECRYPTION UNIT
148 CONTROL UNIT

What is claimed is:
1. An authentication system comprising:
a user device; and a mobile device, wherein
the user device comprises a first memory storing first instructions and a first processor configured to execute the first instructions to:
determine whether a predetermined condition is satisfied, and
transmit key information in a case in which it is determined that the predetermined condition is satisfied, and
the mobile device comprises a second memory storing second instructions and a second processor configured to execute the second instructions to:
acquire biological information of a user,
receive the key information transmitted from the user device, transmit position information of the user whose biological information is acquired to the user device, and authenticate the user by using the acquired biological information, encrypted biological information for collation, and the key information, and wherein the first processor is configured to execute the first instructions to determine whether the predetermined condition is satisfied by using the position information of the user transmitted from the mobile device.

2. The authentication system according to claim 1, wherein the first processor is further configured to execute the first instructions to receive a key information transmission request, the second processor is further configured to execute the second instructions to transmit the key information transmission request to the user device, and the first processor is configured to execute the first instructions to determine whether the predetermined condition is satisfied when the transmission request is received.

3. The authentication system according to claim 1, wherein the first processor is further configured to execute the first instructions to calculate position information of the user device, and the first processor is configured to execute the first instructions to compare the calculated position information with the position information of the user transmitted from the mobile device, and determine whether the predetermined condition is satisfied based on a result of the comparison.

4. The authentication system according to claim 3, wherein the second processor is configured to execute the second instructions to transmit a relative position between the user whose biological information is acquired and a mobile object to the user device as the position information of the user, and the first processor is configured to execute the first instructions to calculate the relative position between the user device and the mobile object as the position information of the user device.

5. The authentication system according to claim 3, wherein the first processor is configured to execute the first instructions to determine that the predetermined condition is satisfied in a case in which a difference between the calculated position information and the position information of the user transmitted from the mobile device is within a predetermined range.

6. The authentication system according to claim 3, wherein the first processor is configured to execute the first instructions to determine whether the user approaches a mobile object based on a change in the calculated position information, and receive the key information transmission request in a case in which it is determined that the user approaches the mobile object.

7. The authentication system according to claim 1, wherein the second processor is further configured to execute the second instructions to acquire the position information of the user whose biological information is acquired.

8. The authentication system according to claim 7, wherein the second processor is configured to execute the second instructions to:

detect a face of the user photographed by using a camera, and acquire a position of the detected face as the position information of the user whose biological information is acquired.

9. The authentication system according to claim 1, wherein the second processor is configured to execute the second instructions to encrypt the acquired biological information, collate the encrypted biological information with the biological information for collation, generate an encrypted collation result, and decrypt the encrypted collation result by using the key information.

10. The authentication system according to claim 9, wherein the second processor is configured to execute the second instructions to standby until the key information is received after the encrypted collation result is generated, and decrypt the encrypted collation result after the key information is received.

11. The authentication system according to claim 1, further comprising a controller configured to control a mobile object based on an authentication result.

12. A user device comprising:

a memory storing instructions; and a processor configured to execute the instructions to:

receive, from a mobile device configured to authenticate a user by using biological information of the user, encrypted biological information for collation, and the key information to the user device, position information of the user whose biological information is acquired;

determine whether a predetermined condition is satisfied by using the position information of the user transmitted from the mobile device; and transmit key information to the mobile device in a case in which it is determined that the predetermined condition is satisfied.

13. The user device according to claim 12, the processor is further configured to execute the instructions to receive a key information transmission request from the mobile device.

14. The user device according to claim 12, wherein the processor is further configured to execute the instructions to calculate position information of the user device, and the processor is configured to execute the instructions to compare the calculated position information with the received position information of the user, and determine whether the predetermined condition is satisfied based on a result of the comparison.

15. The user device according to claim 14, wherein the processor is configured to execute the instructions to determine that the predetermined condition is satisfied in a case in which a difference between the calculated position information and the received position information of the user is within a predetermined range.

16. The user device according to claim 14, wherein the processor is configured to execute the instructions to determine whether the user approaches a mobile object based on a change in the calculated position information, and receive the key information transmission request in a case in which it is determined that the user approaches the mobile object.

17. A key information transmission method comprising:

receiving, from a mobile device configured to authenticate a user by using biological information of the user, encrypted biological information for collation, and the key information to the user device, position information of the user whose biological information is acquired;

determining whether a predetermined condition is satisfied by using the position information of the user transmitted from the mobile device; and transmitting key information to the mobile device in a case in which it is determined that the predetermined condition is satisfied.

\* \* \* \* \*